(12) United States Patent
Vajravel et al.

(10) Patent No.: US 11,650,939 B2
(45) Date of Patent: May 16, 2023

(54) MANAGING ACCESS TO PERIPHERALS IN A CONTAINERIZED ENVIRONMENT

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 17/165,036

(22) Filed: Feb. 2, 2021

(65) Prior Publication Data
US 2022/0245071 A1    Aug. 4, 2022

(51) Int. Cl.
  *G06F 13/12*  (2006.01)
  *G06F 13/10*  (2006.01)
  *G06F 13/38*  (2006.01)

(52) U.S. Cl.
  CPC .......... *G06F 13/126* (2013.01); *G06F 13/105* (2013.01); *G06F 13/122* (2013.01); *G06F 13/385* (2013.01)

(58) Field of Classification Search
  CPC .... G06F 13/126; G06F 13/105; G06F 13/122; G06F 13/385
  See application file for complete search history.

(56) References Cited

U.S. PATENT DOCUMENTS

| | | | |
|---|---|---|---|
| 11,308,001 B1 * | 4/2022 | Vajravel | ................. G06F 13/10 |
| 2020/0174813 A1 * | 6/2020 | Jain | ........................ G06F 9/4868 |
| 2021/0246346 A1 * | 8/2021 | Hasegawa | ............... H01L 22/26 |
| 2022/0171648 A1 * | 6/2022 | Rodriguez | .......... G06F 9/45533 |
| 2022/0209939 A1 * | 6/2022 | Skuliber | ............... H04L 9/3213 |

\* cited by examiner

*Primary Examiner* — Henry Tsai
*Assistant Examiner* — Aurangzeb Hassan
(74) *Attorney, Agent, or Firm* — Kirton McConkie; Brian Tucker

(57) ABSTRACT

Access to peripherals can be managed in a containerized environment. A management service can be employed on a computing device to detect when a container is created. When a container is created or a peripheral is connected, the management service can determine that an application running within the container should be allowed to access a peripheral. The management service can then interface with a peripheral mapper running within the container to enable the application to access the peripheral. A peripheral access manager can also be employed to isolate the peripheral to the container.

17 Claims, 11 Drawing Sheets

| App Info | Peripheral Info | Access Info |
|---|---|---|
| App1-Name | /dev/ttyUSB0 | All |
| App2-Name | USB:<VID>:<PID> | Read-Only |
| App3-Name | USB:Class:SC:Prot | All |
| ... | | |

*FIG. 6*

MANAGING ACCESS TO PERIPHERALS IN
A CONTAINERIZED ENVIRONMENT

CROSS-REFERENCE TO RELATED
APPLICATIONS

N/A

BACKGROUND

Containerization in the software context refers to a technique for packaging an application and its dependencies into a container to abstract/isolate the application from the underlying host operating system and environment. A number of containerization techniques exist. FIG. 1 represents a computing device 100 that has physical hardware 101, a hypervisor 102 and a host operating system 120. Application 121 is an example of an application that is not containerized in that it relies on binaries/libraries 120 to interface directly with host operating system 110. In contrast, application 122 represents an application that is executed in a first type of container in which containerization is implemented using access control mechanisms 123. Examples of solutions that implement containerization through access control mechanisms 123 include Security-Enhanced Linux (SELinux) and AppArmor.

Applications 123 and 124 represent examples of applications that are executed in a second type of container in which containerization is implemented using software virtualization. Examples of solutions that implement containerization through software virtualization include Docker and FreeBSD Jails. As represented in FIG. 1, each application 123 and 124 and its binaries/libraries 131a and 131b may be isolated within its own container 132 that is executed via a docker engine 130 that runs on host operating system 110. Variations of this second type of container include Intel Software Guard Extensions (SGX) and Arm TrustZone which containerize an application within a secure region of memory.

Applications 125 and 126 represent examples of applications that are executed in a third type of container in which containerization is implemented using hardware virtualization. Examples of solutions that implement containerization through hardware virtualization include Intel Clear Containers, Hyper-V Docker and Qubes OS. As represented in FIG. 1, with this third type of container, a uni/mini kernel 140 is executed on hypervisor 102. A docker engine 141 can then be run on uni/mini kernel 140 to containerize applications 125 and 126 and their respective binaries/libraries 142a and 142b.

Although not represented in FIG. 1, it is even possible to combine multiple types of containerization solutions. For example, Docker may be used with SELinux to execute an application. As another example, Graphene combines software enclaves (e.g., Intel SGX) with hardware virtualization (e.g., via a unikernel). Accordingly, there is a wide variety of container modes for executing an application.

It is becoming more common for an enterprise to use containerization solutions to run applications on computing devices that its employees may use. A primary benefit of employing containerization solutions is that it enables the applications to be deployed and launched from a cloud-based management server or other centralized repository as opposed to being installed on the computing devices in a traditional manner. As a result, the employees can launch the applications on a variety of computing devices.

Although employing a containerized environment to run applications on a computing device provides various benefits, it also introduces a number of limitations. For example, containers have traditionally been used to run background services or applications that do not interface with the user. More recently, however, it is becoming common to run user interactive applications in containers. In such cases, it is necessary to allow the containers to access peripherals—i.e., to have privileged access rights. When a container is granted privileged access rights (a "privileged container"), an app running in the privileged container will be enabled to access peripherals and to perform other privileged tasks. Privileged containers therefore contradict one of the primary purposes of a container—isolation of the application for security purposes.

Currently, there is no mechanism to selectively and securely enable access to peripherals in a containerized environment. There is also no mechanism to manage access to peripherals in a containerized environment in accordance with security policies applicable to the computing device on which the containerized environment is implemented.

BRIEF SUMMARY

The present invention extends to systems, methods and computer program products for managing access to peripherals in a containerized environment. A management service can be employed on a computing device to detect when a container is created. When a container is created or a peripheral is connected, the management service can determine that an application running within the container should be allowed to access a peripheral. The management service can then interface with a peripheral mapper running within the container to enable the application to access the peripheral. A peripheral access manager can also be employed to isolate the peripheral to the container.

In some embodiments, the present invention is implemented as a method for managing access to peripherals in a containerized environment. A management service can detect that a first container has been started on a computing device. The management service can access a policy applicable to a first application that runs in the first container. The management service can determine that the policy indicates that a first peripheral should be accessible to the first application. The management service can then map the first peripheral to the first container to cause the first peripheral to be accessible to the first application.

In some embodiments, the present invention is implemented as computer storage media storing computer executable instructions which when executed implement a method for managing access to peripherals in a containerized environment. A management service can determine that a policy indicates that a first peripheral should be accessible to a first application that runs in a first container. The management service can then map the first peripheral to the first container to cause the first peripheral to be accessible to the first application.

In some embodiments, the present invention may be implemented as a method for managing access to peripherals in a containerized environment. A management service can detect that a software container has been started on a computing device. The management service can access a policy applicable to a first application that runs in the software container. The management service can determine that the policy indicates that a first peripheral should be accessible to the first application. The management service can map the first peripheral to the software container to cause the first peripheral to be accessible to the first application. The management service can also detect that a hardware container has been started on the computing device. The management service can determine that the policy indicates that a second peripheral should be accessible to a second application that runs in the hardware container. The management service can map the second peripheral to the hardware container to cause the second peripheral to be accessible to the second application.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 6 provides an example of a policy that may be employed in one or more embodiments of the present invention.

DETAILED DESCRIPTION

In this specification and the claims, the term "containerized environment" will be used to reference a computing device on which applications may be run in containers, including hardware containers and software containers. A containerized environment may include a single type of container or multiple types of containers. The containerized environment could exist on an end user computing device or on a server computing device (e.g., when the containerized applications are accessed by the end user via a virtual desktop infrastructure).

Figure 1:
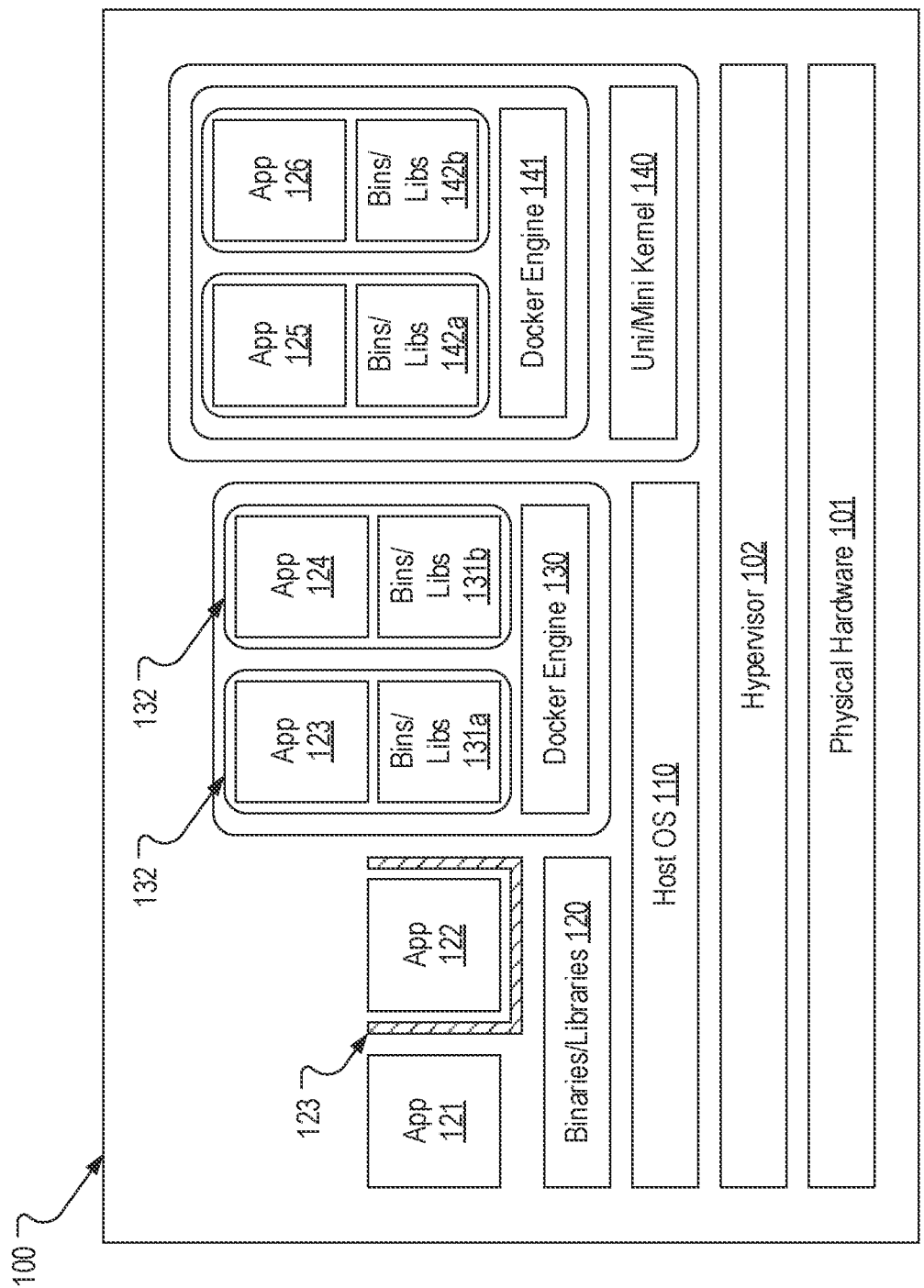
FIG. 1 provides examples of various types of containers that can be used to execute an application on a computing device.
Figure 2:
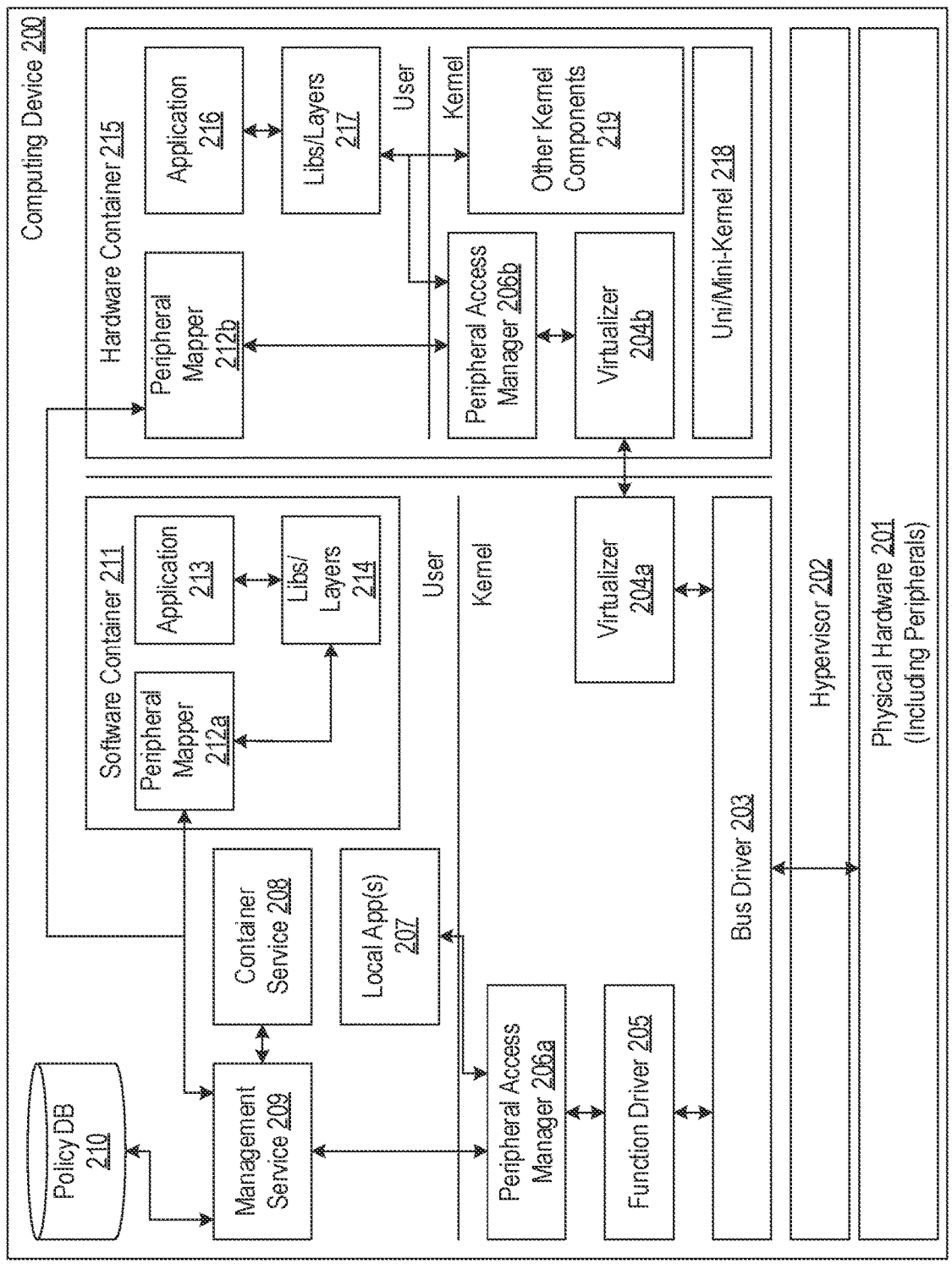
FIG. 2 provides an example of various components that may be employed on a computing device to manage access to peripherals in a containerized environment in accordance with one or more embodiments of the present invention.

FIG. 2 provides an example of various components that may be employed on a computing device 200 to manage access to peripherals in a containerized environment that exists on computing device 200. FIG. 2 is generally similar to FIG. 1 but includes a number of additional components for implementing embodiments of the present invention. As shown, computing device 200 can include physical hardware 201 that may include peripherals. These peripherals could be integrated into computing device 200 or connected to computing device 200 at any time. For example, the peripherals could include a webcam, a microphone, a USB storage drive, a printer, etc. In some embodiments, a hypervisor 202 may also exist on computing device 200 such as when hardware containers may be employed.

Various drivers may be loaded on computing device 200 to provide access to a peripheral. For example, a bus driver 203 may support access to peripherals connected to a common bus. Additionally, a peripheral-specific function driver 205 may be loaded above bus driver 203 thereby creating a device stack for the peripheral. Although a single function driver 205 is shown, there may be multiple function drivers 205 loaded on computing device 200 corresponding to the peripherals that are connected to computing device 200. As is known, user mode components can interface with function driver 205 to access the corresponding peripheral.

In scenarios where one or more hardware containers 215 may be created on computing device 200, a virtualizer 204a can be employed on the host operating system in conjunction with a virtualizer 204b in the hardware container 215 to virtualize a peripheral within hardware container 215. More particularly, virtualizers 204a and 204b can cause a virtual peripheral to be accessible within hardware container 215 and can route communications targeting the virtual peripheral to the actual peripheral. Virtualizers 204a and 204b can employ any suitable virtualization technique to accomplish this (e.g., USB redirection, driver mapping, etc.). Similar to what is shown in FIG. 1, hardware container 215 may include a uni/mini-kernel 218 and other kernel components 219.

In accordance with embodiments of the present invention, a peripheral access manager 206a can be loaded above any function driver 205 in the host operating system environment and above virtualizer 204b in any hardware container 215. For example, peripheral access manager 206a and 206b could be in the form of upper filter drivers that are loaded on the device stack of any peripheral for which embodiments of the present invention may manage access. Because peripheral access manager 206a and 206b are loaded above function driver 205 and virtualizer 204b (which may include a function driver for the virtualized device) respectively, they will receive any I/O requests issued by user-mode components that target the corresponding peripheral. These sources of I/O requests can include containerized application (e.g., application 213 and application 216) and local applications 207.

A container service 208 may also be loaded on computing device 200 and may represent any components that manage containers on computing device 200. As one example only, container service 208 could represent the Docker daemon and its corresponding CLI and API. A management service 209 may be employed to interface with container service 208 for the purpose of detecting when a container is started or stopped on computing device 200. Management service 209 may also interface with the host operating system to detect when a peripheral is connected to (or enumerated on) computing device 200.

A policy database 210 may be maintained on computing device 200 for storing policies defining how access to peripherals in a containerized environment should be managed. Policy database 210 can represent any type of storage mechanism for maintain or providing access to such policies. In some embodiments, policy database 210 may exist on a server rather than on computing device 200. In any case, policy database 210 may preferably be managed centrally to thereby allow an administrator to define and distribute policies. These policies may be specific to computing device 200 or specific to a particular user or may be applicable to some other category or grouping of computing devices and/or users. As described in detail below, management service 209 may obtain applicable policies from policy database 210 as part of managing how a particular containerized application may access peripherals.

When a software container 211 is created to host an application 213 that relies on libraries/layers 214, a peripheral mapper 212a can be included within software container 211. As described below, peripheral mapper 212a can interface with libraries/layers 214 and management service 209 to enable application 213 to access a peripheral while also allowing such access to be managed in accordance with any applicable policy. Similarly, when a hardware container 215 is created to host an application 216 that relies on libraries/layers 217, a peripheral mapper 212b can be included within hardware container 215. Peripheral mapper 212b can interface with peripheral access manager 206b and management service 209 to enable application 216 to access a peripheral while also allowing such access to be managed in accordance with any applicable policy.

Figure 3A:
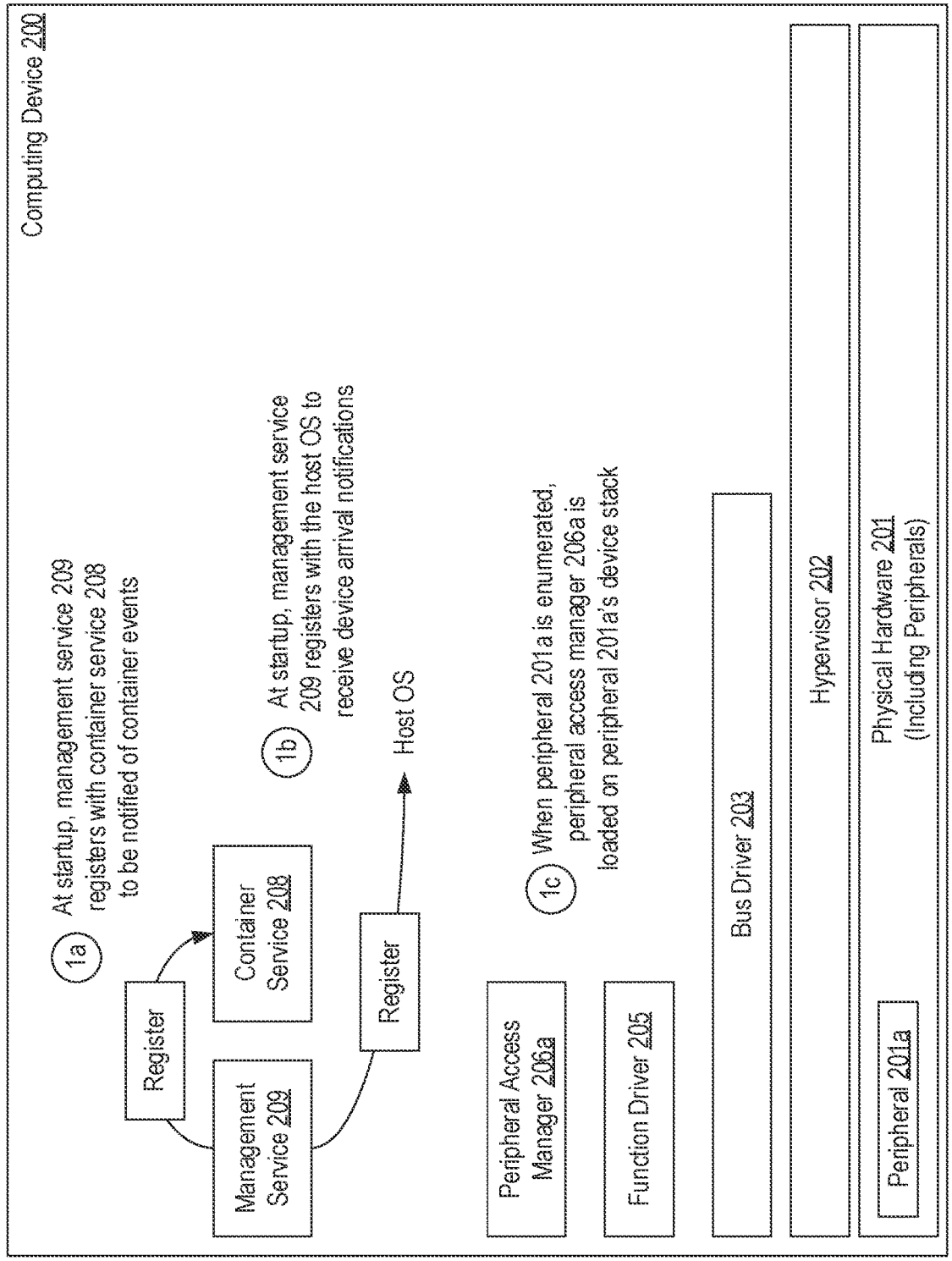
FIGS. 3A and 3B provide an example of how a management service can be configured to detect when a container is started and when a peripheral is connected in accordance with one or more embodiments of the present invention.
Figure 3B:
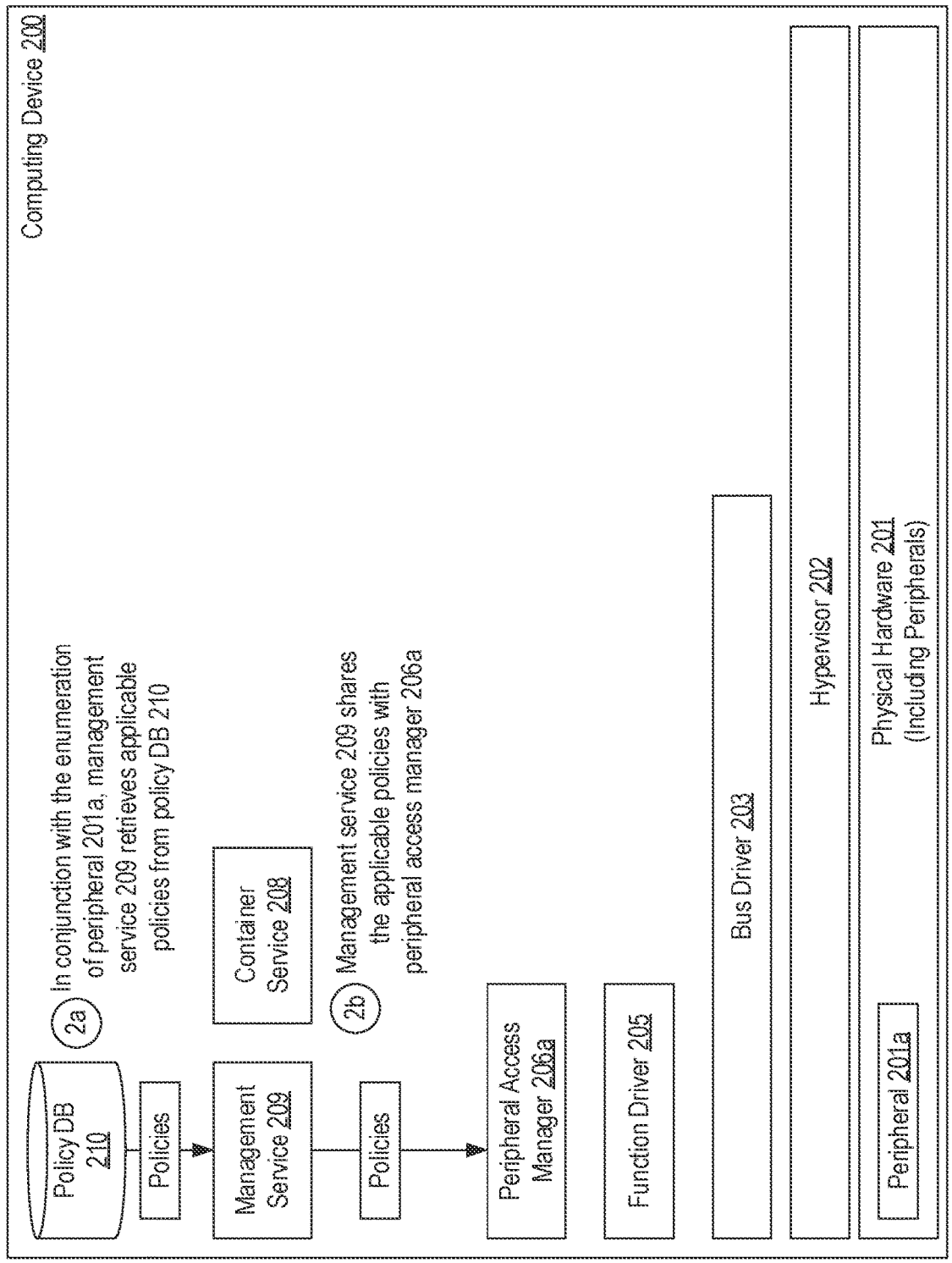

In accordance with embodiments of the present invention, management service 209 can be configured to detect when a container is started (i.e., when a containerized application is launched on computing device 200) and, in response, can perform various functionality to enable the containerized application to access peripherals only in accordance with applicable polices. Likewise, management service 209 can be configured to detect when a peripheral is connected to computing device 200 and can cause the peripheral to be accessible to a containerized application in accordance with applicable policies. FIGS. 3A and 3B provide an example of how management service 209 can be configured to detect when a container is started and when a peripheral is connected (or enumerated) to enable it to apply policies to manage a containerized application's access to peripherals.

In FIG. 3A, it is assumed that management service 209 has just been loaded such as, for example, as part of booting computing device 200. At this point, it is assumed that no containers have been created on computing device 200. As part of management service 209's startup, in step 1a, it can register with container service 208 to receive notifications of container events. For example, if container service 208 represents the Docker daemon, management service 209 could employ the Docker CLI to listen for container start and stop events. In step 1b, management service 209 can also register with the host operating system to receive notifications when a peripheral is connected to (or enumerated on) computing device 200. For example, in a Windows-based implementation, management service 209 could call the RegisterDeviceNotificationW function or otherwise listen for device arrival notifications.

In step 1c, it is assumed that a peripheral 201a, which may be integrated into computing device 200 or manually connected, is being enumerated. As a result of this enumeration process, function driver 205 is loaded to enable peripheral 201a to be accessed. Notably, although FIG. 3A represents a scenario where peripheral 201a is enumerated when no containers have been started (e.g., as part of the startup of computing device 200), the enumeration process would also be performed if peripheral 201a is connected when containers are running.

Turning to FIG. 3B, in conjunction with the enumeration of peripheral 201a on computing device 200, the host operating system will notify management service 209 that peripheral 201a has been connected. In response, and as represented by step 2a, management service 209 can retrieve from policy database 210 any policy applicable to peripheral 201a. For example, by examining the device arrival notification it receives from the host operating system and/or by issuing one or more requests to function driver 205 or another driver in peripheral 201a's device stack, management service 209 could obtain one or more identifiers of peripheral 201a and/or one or more characteristics of peripheral 201a. Management service 209 could then use such identifiers and/or characteristics to retrieve any matching policy in policy database 210. In step 2b, which may be performed in some embodiments, management service 209 can send any applicable policy to peripheral access manager 206a. Although FIG. 3B represents a scenario where a container has not yet been started, management service 209 can perform steps 2a and 2b even when one or more containers are running when a peripheral is enumerated.

Figure 4A:
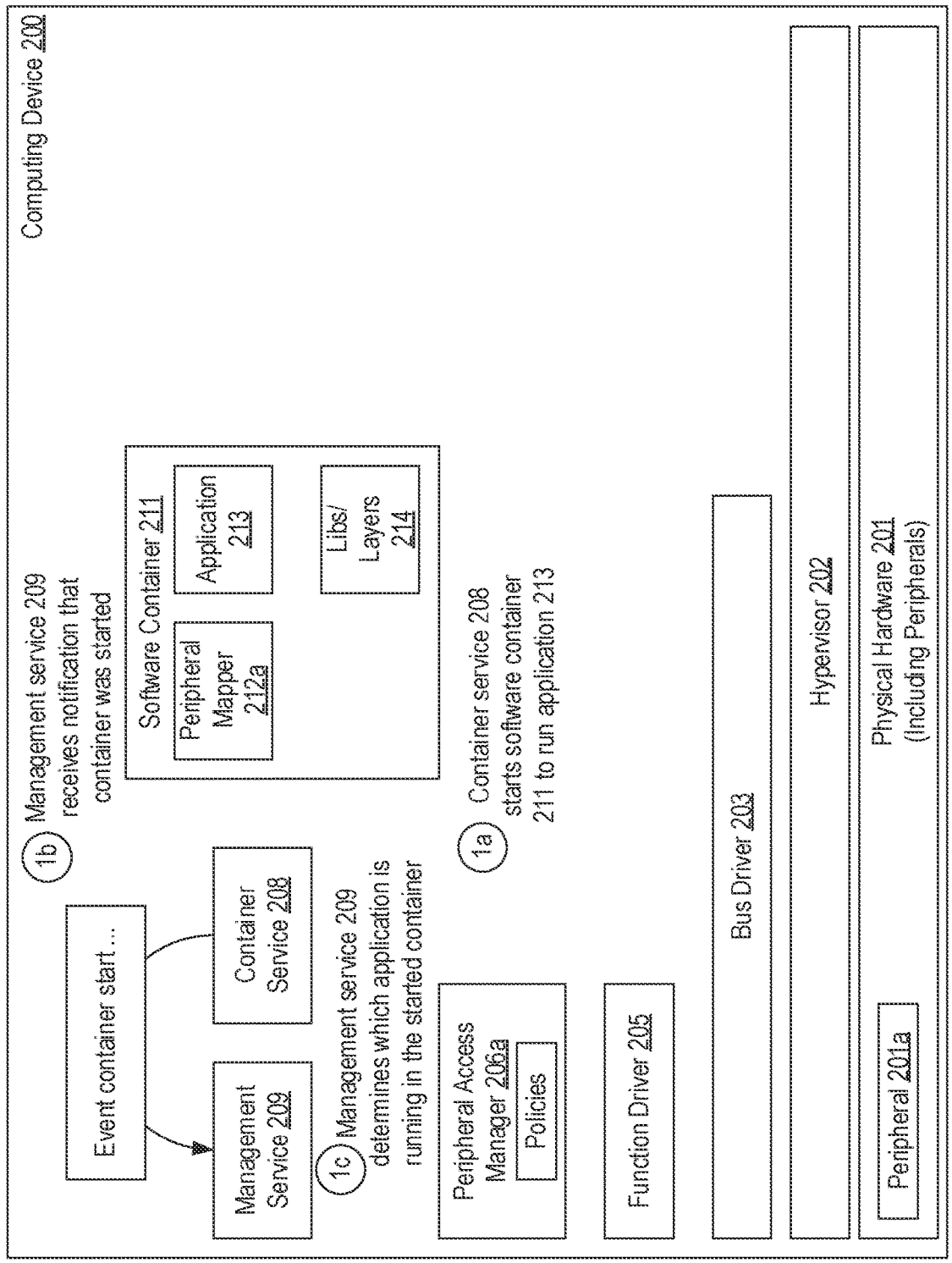
FIGS. 4A-4C represent how plug-and-play functionality can be extended to containerized environments in accordance with policy in accordance with one or more embodiments of the present invention.
Figure 4B:
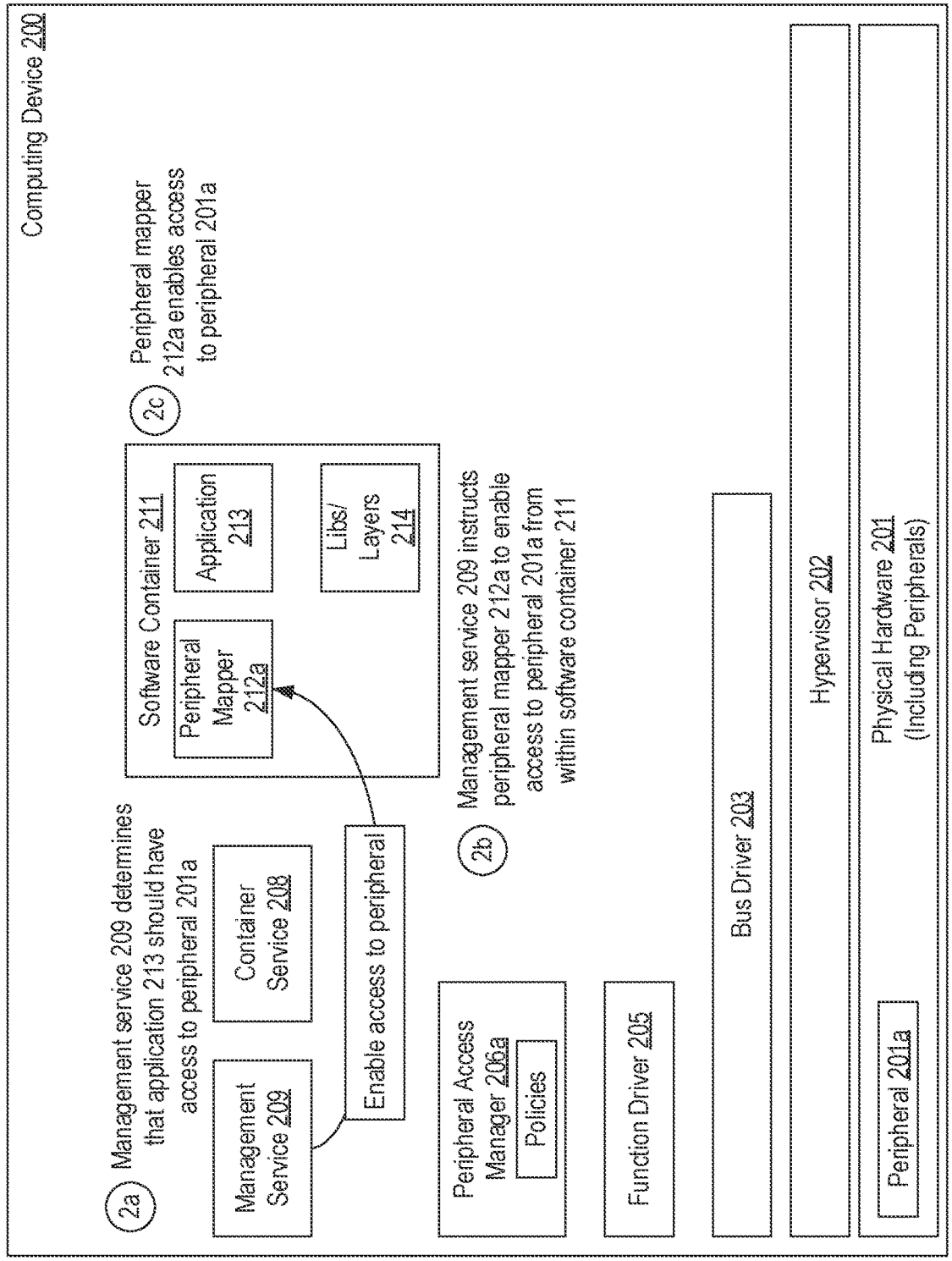
Figure 4C:
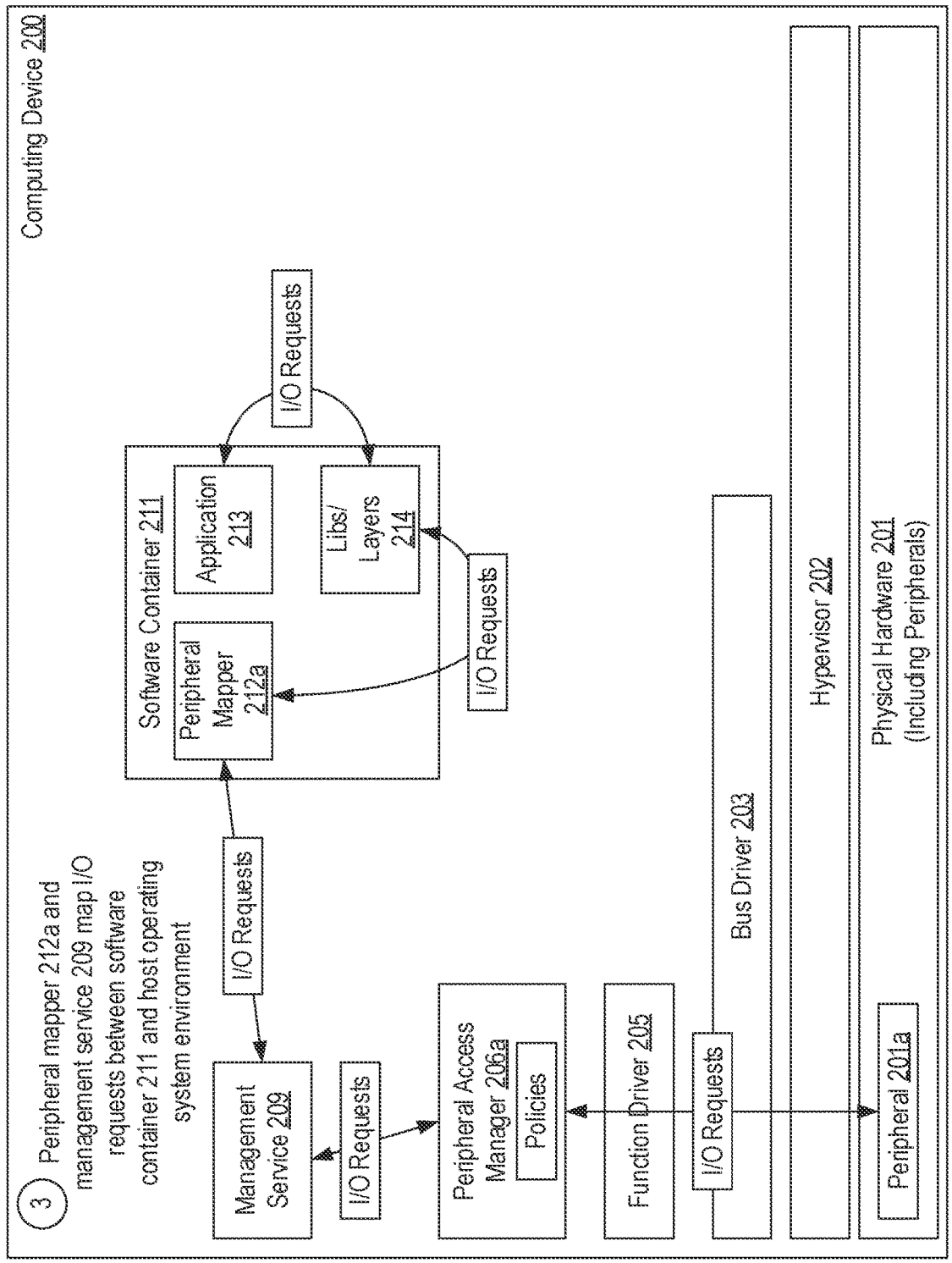

FIGS. 4A-4C provide an example of functionality that can be performed when software container 211 is started to enable application 213 to access peripheral 201a (or any other peripheral) in accordance with applicable policies. In other words, FIGS. 4A-4C can represent how embodiments of the present invention may enable plug-and-play functionality within software container 211 when a peripheral is enumerated by the host operating system. It is assumed that, in step 1a, container service 208 starts software container 211. When a container is started, it is typically created from an image that includes the application to be run within the container. In accordance with embodiments of the present invention, the image from which software container 211 is created and run can also include peripheral mapper 212a such that peripheral mapper 212a will run within software container 211 alongside application 213. In step 1b, in conjunction with software container 211 being started, management service 209 can receive a corresponding notification. In step 1c and in response to receiving such notification, management service 209 can determine which application is running within the started container. For example, management service 209 could identify application 213 based on an image name specified in the container start event it received in step 3b or could query peripheral mapper 212a to retrieve information about any running application within the container. In some embodiments, in addition to identifying which application is running within software container 211, management service 209 may also obtain characteristics and capabilities of software container 211 such as the unique identifier of software container 211, its internal IP address, any storage volumes mounted in the container, any security settings for the container, etc.

Turning to FIG. 4B, in step 2a, it is assumed that management service 209 determines that application 213 should have access to peripheral 201a. For example, management service 209 could evaluate the policies stored in policy database 210 to determine if any applicable policy specifies that application 213 should have read and/or write access to peripheral 201a. Such a policy could identify the name of application 213 and an identifier of peripheral 201a along with the type of access that should be allowed. In step 2b, management service 209 can instruct peripheral mapper 212a to enable access to peripheral 201a from within software container 211. For example, management service 209 could send peripheral mapper 212a an identification of peripheral 201a and any information necessary to create a representation of peripheral 201a (e.g. a symbolic link) within software container 211. In step 2c, peripheral mapper 212a can then enable access to peripheral 201a such as by creating a symbolic link for peripheral 201a within software container 211. After step 2c, application 213 will "see" peripheral 201a and will therefore be able to send requests to it.

In some embodiments, policy may dictate that only a portion of the functionality/capabilities of peripheral 201a should be made accessible to application 213. For example, if peripheral 201a has multiple interfaces, policy could dictate that only one interface should be made available. Or, policy may dictate that only read access should be provided. In such cases, management service 209 can provide information to peripheral mapper 212a to ensure that only the allowed functionality/capabilities of peripheral 201a are exposed within software container 211.

Turning to FIG. 4C, once peripheral mapper 212a has caused peripheral 201a to appear within software container 211, application 213 will be able to send I/O requests to peripheral 201a in a typical fashion. However, as represented as step 3, peripheral mapper 212a and management service 209 can interoperate to map these I/O requests between software container 211 and the host operating system environment. In particular, when peripheral mapper 212a receives an I/O request that targets peripheral 201a, it can relay sufficient information about the I/O request to enable management service 209 to create and send an equivalent I/O request in the host operating system environment. Then, when management service 209 receives a response (if any), it can send sufficient information to enable peripheral mapper 212a to create and return an equivalent response in the environment of software container 211. This functionality could be performed to allow application 213 to access any peripheral that may be connected to computing device 200. Also, if a peripheral is connected while software container 211 is running, steps 2a-2c can be performed to enable the newly connected peripheral to be accessible within software container 211 (assuming policy would allow it). If software container 211 is stopped (of which container service 208 may notify management service 209) or if peripheral 201a is disconnected (or which the host operating system may notify management service 209), management service 209 can cancel any pending I/O requests pertaining to peripheral 201a.

As a result of the above-described functionality, peripheral 201a can be made available within software container 211 in accordance with policy. However, peripheral 201a may still remain accessible to local applications 207 and may also be made accessible within other containers such as privileged containers. In some cases, however, it may be desirable to isolate a peripheral to a particular container, or in other words, to allow a peripheral to be accessible only to an application or applications running within a particular container.

Figure 5A:
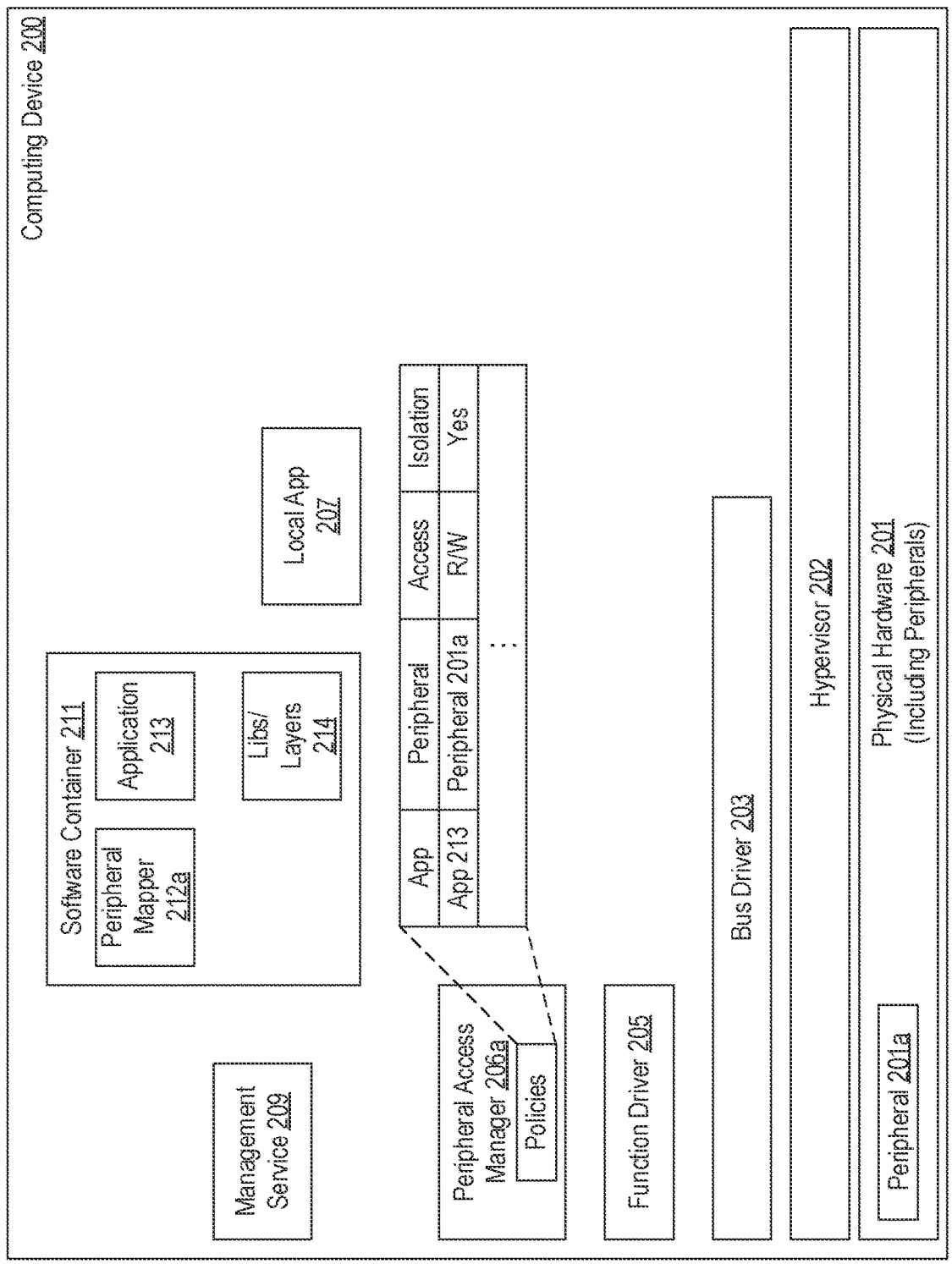
FIGS. 5A-5C represent how isolation techniques can be implemented in a containerized environment in accordance with one or more embodiments of the present invention.
Figure 5B:
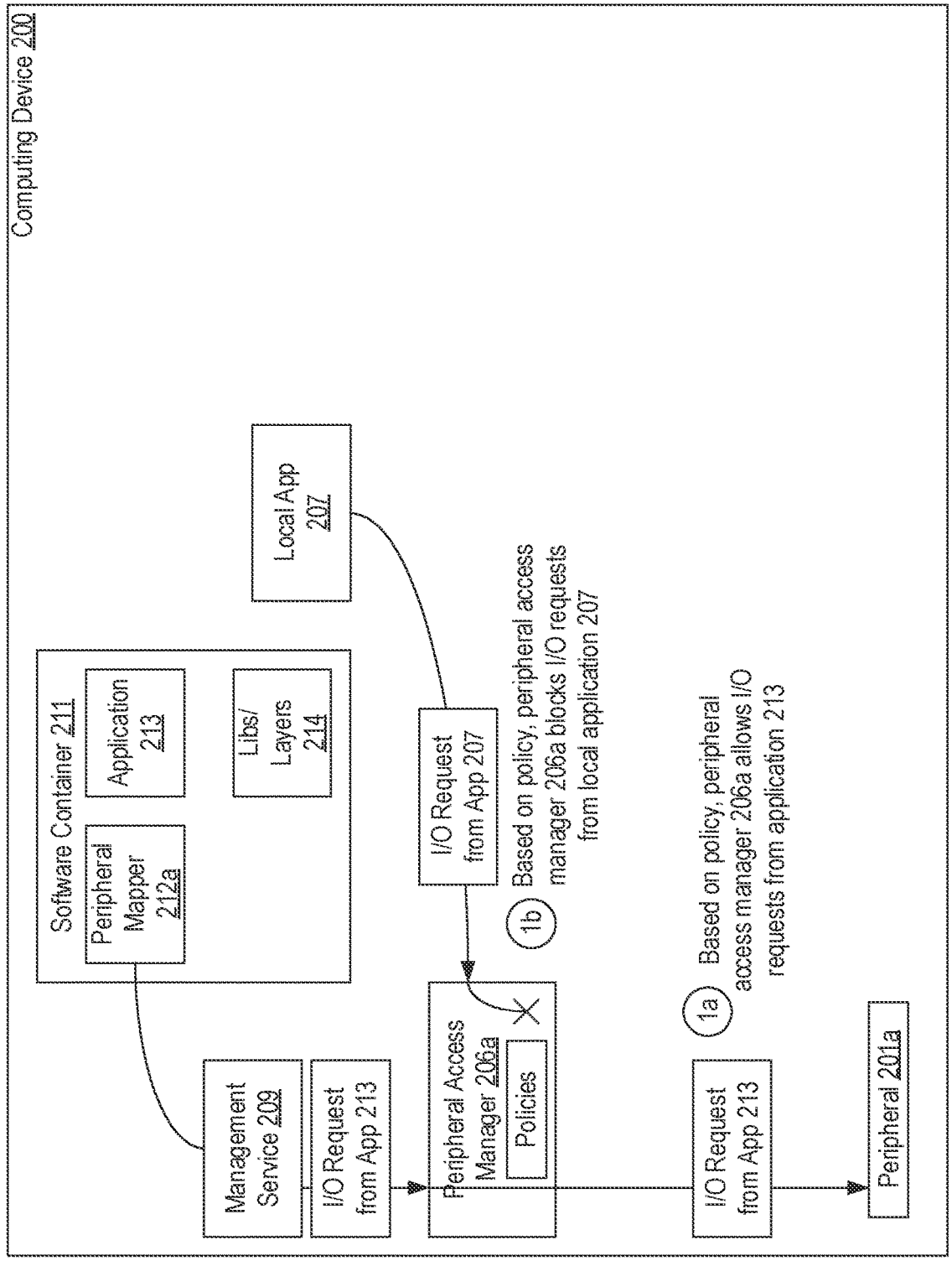
Figure 5C:
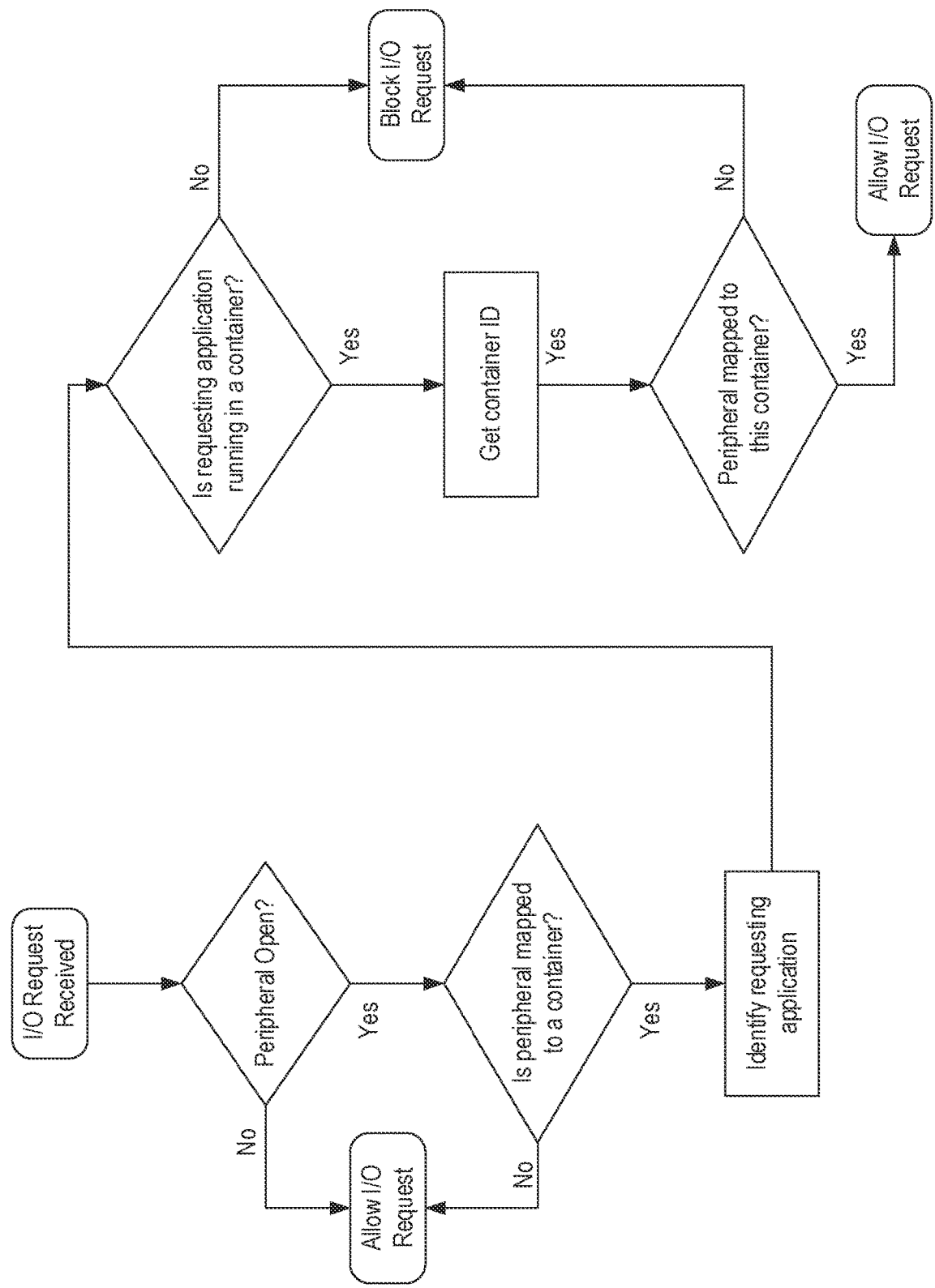

FIGS. 5A-5C represent how peripheral access manager 206a can implement isolation techniques. As shown in FIG. 5A, it is assumed that the policies that management service 209 shared with peripheral access manager 206a indicate that application 213 should have read/write access to peripheral 201a and that such access should be isolated. It is also assumed that application 213 is running in software container 211 and local application 207 is also running. As represented as step 1a in FIG. 5B, based on this policy, peripheral access manager 206a allows I/O requests from application 213 that target peripheral 201a. In contrast, as represented as step 1b, peripheral access manager 206a blocks I/O requests from local application 207 (or any other application) that target peripheral 201a.

FIG. 5C provides a flowchart representing the functionality that peripheral access manager 206a can perform to accomplish this selective blocking of I/O requests to implement isolation techniques. When peripheral access manager 206a receives an I/O request, it can determine whether the I/O request is an attempt to open the peripheral (e.g., an IRP_MJ_CREATE in a Windows implementation). If not, peripheral access manager 206a can allow the I/O request based on the assumption that only an application that has successfully opened the peripheral will be able to submit subsequent I/O requests that target the peripheral. In contrast, if the I/O request is an attempt to open the peripheral, peripheral access manager 206a can perform a number of steps to ensure that isolation is implemented if policy dictates.

These steps include determining whether the targeted peripheral is mapped to a container. To enable peripheral access manager 206a to perform this step, management service 209 can provide peripheral access manager 206a with information identifying any container to which peripheral 201a is mapped. If the peripheral is not mapped to a container (or possibly if the peripheral is mapped to the container but isolation is not implemented), peripheral access manager 206a can allow the I/O request. In contrast, if the peripheral is mapped to a container (and possibly if policy dictates that isolation should be implemented), peripheral access manager 206a can identify the requesting application (i.e., the source of the I/O request). Once the requesting application is identified, peripheral access manager 206a can determine if the requesting application is running in a container. If not, peripheral access manager 206a can block the I/O request. On the other hand, if the requesting application is running in a container, peripheral access manager 206a can obtain the identifier of the container in which the requesting application is running. Peripheral access manager 206a can then determine if the peripheral is mapped to the identified container in which the requesting application is running. If so, peripheral access manager 206a can allow the I/O request. If not, peripheral access manager 206a can block the I/O request. As a result of this functionality, when policy dictates that a peripheral should be isolated, peripheral access manager 206a can ensure that I/O requests generated by an application in a container to which the peripheral is mapped will be allowed while other I/O requests will be blocked.

Similar techniques can be performed when the container is a hardware container with various modifications to account for how peripherals are virtualized in the hardware container environment. For example, if peripheral 201a is virtualized in hardware container 215, virtualizer 204b will create a device stack within hardware container 215 through which application 216 accesses peripheral 201a. Peripheral access manager 206b can be loaded on this device stack to perform the functionality that peripheral access manager 206a performs as described above. Peripheral mapper 212b can also perform similar functionality as peripheral mapper 212a but may also function to relay to peripheral access manager 206b policies or other information that it receives from management service 209.

FIG. 6 provides a simplified example of a policy that may be employed in embodiments of the present invention. As shown, this policy can link an application (e.g., by its name or other identifier) to a particular peripheral or type of peripheral and specify the type of access the application should have. Notably, a policy may identify a peripheral by its persistent identifier as opposed to a device path that may change across reboots or connections.

In summary, embodiments of the present invention can be implemented to manage whether and how a peripheral may be accessed by a containerized application without needing to elevate the privileges of the container and regardless of when a container is started or when a peripheral is connected. This management can include isolating a peripheral to a particular container including preventing the peripheral from being accessed by any local applications or any applications running in privileged containers. The techniques of these embodiments can be implemented with either or both software containers and hardware containers and with any type of peripheral. The access management that embodiments of the present invention provide can also be centrally managed by an administrator through the deployment of policies.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing access to peripherals in a containerized environment, the method comprising:
   detecting, by a management service, that a first container has been started on a computing device;
   accessing, by the management service, a policy that defines whether a first application that runs in the first container is allowed to access one or more peripherals;
   determining, by the management service, that the policy indicates that the first application is allowed to access a first peripheral;
   mapping, by the management service, the first peripheral to the first container to cause the first peripheral to be accessible to the first application;
   receiving, at a peripheral access manager that is loaded on a device stack of the first peripheral, a first I/O request;
   determining, by the peripheral access manager, that the first application created the first I/O request; and
   allowing the first I/O request.

2. The method of claim 1, wherein mapping the first peripheral to the first container comprises interfacing with a peripheral mapper that runs in the first container.

3. The method of claim 2, wherein the peripheral mapper creates a symbolic link to the first peripheral within the first container to cause the first peripheral to be accessible to the first application.

4. The method of claim 3, further comprising:
   receiving, at the peripheral mapper, an I/O request that the first application created and that targets the first peripheral; and
   providing, by the peripheral mapper, the I/O request to the management service to thereby cause the management service to submit the I/O request to the first peripheral.

5. The method of claim 4, further comprising:
   receiving, by the management service, a response to the I/O request; and
   providing, by the management service, the response to the I/O request to the peripheral mapper to thereby cause the peripheral mapper to return the response to the I/O request to the first application.

6. The method of claim 1, further comprising:
   receiving, at the peripheral access manager, a second I/O request;
   determining, by the peripheral access manager, that the second I/O request did not originate from the first container; and
   blocking the second I/O request.

7. The method of claim 1, wherein the first container is one of a software container or a hardware container.

8. The method of claim 1, wherein determining that the policy indicates that the first application is allowed to access the first peripheral comprises determining that the policy associates an identifier of the first application with an identifier of the first peripheral.

9. The method of claim 8, wherein the identifier of the first peripheral is a persistent identifier.

10. The method of claim 1, further comprising:
   detecting, by the management service, that a second peripheral has been connected to the computing device while the first container is running;
   determining, by the management service, that the policy indicates that the first application is allowed to access the second peripheral; and mapping, by the management service, the second peripheral to the first container to cause the second peripheral to be accessible to the first application.

11. One or more computer storage media storing computer executable instructions which when executed implement a method for managing access to peripherals in a containerized environment, the method comprising:
    detecting, by a management service, that a first peripheral has been connected to a computing device while a first container is running;
    determining, by the management service, that a policy indicates that a first application that runs in the first container is allowed to access the first peripheral;
    mapping, by the management service, the first peripheral to the first container to cause the first peripheral to be accessible to the first application, wherein mapping the first peripheral to the first container comprises interfacing with a peripheral mapper that runs in the first container;
    receiving, at the peripheral mapper, an I/O request that the first application created and that targets the first peripheral; and
    providing, by the peripheral mapper, the I/O request to the management service to thereby cause the management service to submit the I/O request to the first peripheral.

12. The computer storage media of claim 11, wherein mapping the first peripheral to the first container comprises causing the peripheral mapper running in the first container to create a representation of the first peripheral within the first container.

13. The computer storage media of claim 11, wherein the method further comprises:
    receiving, at a peripheral access manager that is loaded on a device stack for the first peripheral, I/O requests that target the first peripheral; and
    for each of the I/O requests that originated from the first container, allowing the I/O request, whereas, for each of the I/O requests that did not originate from the first container, blocking the I/O request.

14. The computer storage media of claim 11, wherein the first container is a software container or a hardware container.

15. A method for managing access to peripherals in a containerized environment, the method comprising:
    detecting, by a management service, that a software container has been started on a computing device;
    accessing, by the management service, a policy applicable to a first application that runs in the software container;
    determining, by the management service, that the policy indicates that a first peripheral should be accessible to the first application;
    mapping, by the management service, the first peripheral to the software container to cause the first peripheral to be accessible to the first application;
    detecting, by the management service, that a hardware container has been started on the computing device;
    determining, by the management service, that the policy indicates that a second peripheral should be accessible to a second application that runs in the hardware container;
    mapping, by the management service, the second peripheral to the hardware container to cause the second peripheral to be accessible to the second application;
    loading a peripheral access manager on a device stack for the first peripheral in a host operating system environment; and
    blocking, by the peripheral access manager, I/O requests that target the first peripheral that did not originate from the software container;
    wherein mapping the first peripheral to the software container comprises interfacing with a peripheral mapper that runs in the software container; and
    wherein mapping the second peripheral to the hardware container comprises interfacing with a peripheral mapper that runs in the hardware container.

16. The method of claim 15, wherein mapping the second peripheral to the hardware container comprises loading a peripheral mapper in the hardware container.

17. The method of claim 15, further comprising:
    blocking, by the peripheral access manager, I/O requests that target a functionality or a capability of the second peripheral that the policy does not allow.

* * * * *